Dec. 21, 1948.    F. M. FRAGA    2,456,693
LIFTING HITCH FOR IMPLEMENTS
Filed Aug. 26, 1946    2 Sheets-Sheet 1

INVENTOR.
F. M. Fraga
BY
ATTYS

Dec. 21, 1948. F. M. FRAGA 2,456,693
LIFTING HITCH FOR IMPLEMENTS
Filed Aug. 26, 1946 2 Sheets-Sheet 2

INVENTOR.
F. M. Fraga
BY
Webster & Webster
ATTYS

Patented Dec. 21, 1948

2,456,693

UNITED STATES PATENT OFFICE 2,456,693

LIFTING HITCH FOR IMPLEMENTS

Frank M. Fraga, Fresno, Calif.

Application August 26, 1946, Serial No. 693,139

13 Claims. (Cl. 97—50)

This invention is directed to an implement hitch adapted to be connected with a power lift device on a tractor at the rear whereby the implement, such as a disc harrow, may be adjusted vertically for working depth or lifted clear of the ground for turning in the field or transport from place to place.

In certain tractors, such as the "Ford-Ferguson" the power lift device is associated with an automatic lift control mechanism operative upon excessive drag reaction from the implement, through the medium of a longitudinal thrust arm, to cause the power lift device to raise the implement sufficient to relieve such excessive drag.

The present invention provides a hitch of implement lift type, which includes a frame structure arranged to carry the major part of the weight of the implement in a manner such that the latter may be connected to said automatic lift control mechanism of the tractor, and said mechanism function in any position of vertical adjustment of the implement without the weight or load of the latter being imposed on said mechanism to any material extent. Thus the automatic lift control mechanism operates normally at all times, regardless of the vertical position of the implement.

The hitch is further characterized by novel means for adjustment of the connections between the implement and the thrust arm which imparts excessive drag reaction to the automatic lift control mechanism; such adjustment not only varying the working angle of the supported implement in a vertical plane lengthwise of the direction of travel, but also regulating the point at which excessive drag reaction will cause the automatic lift control mechanism to function.

An additional feature of the hitch is its stability in use, while embodying a relatively simple structure.

A further object of the invention is to produce a practical device and one which will be exceedingly effective for the purpose for which it is designed.

These objects are accomplished by means of such structure and relative arrangement of parts as will appear by a perusal of the following specification and claims.

In the drawings:

Figure 3 is a fragmentary sectional elevation of the adjustable connecting rod unit.

Figure 1:
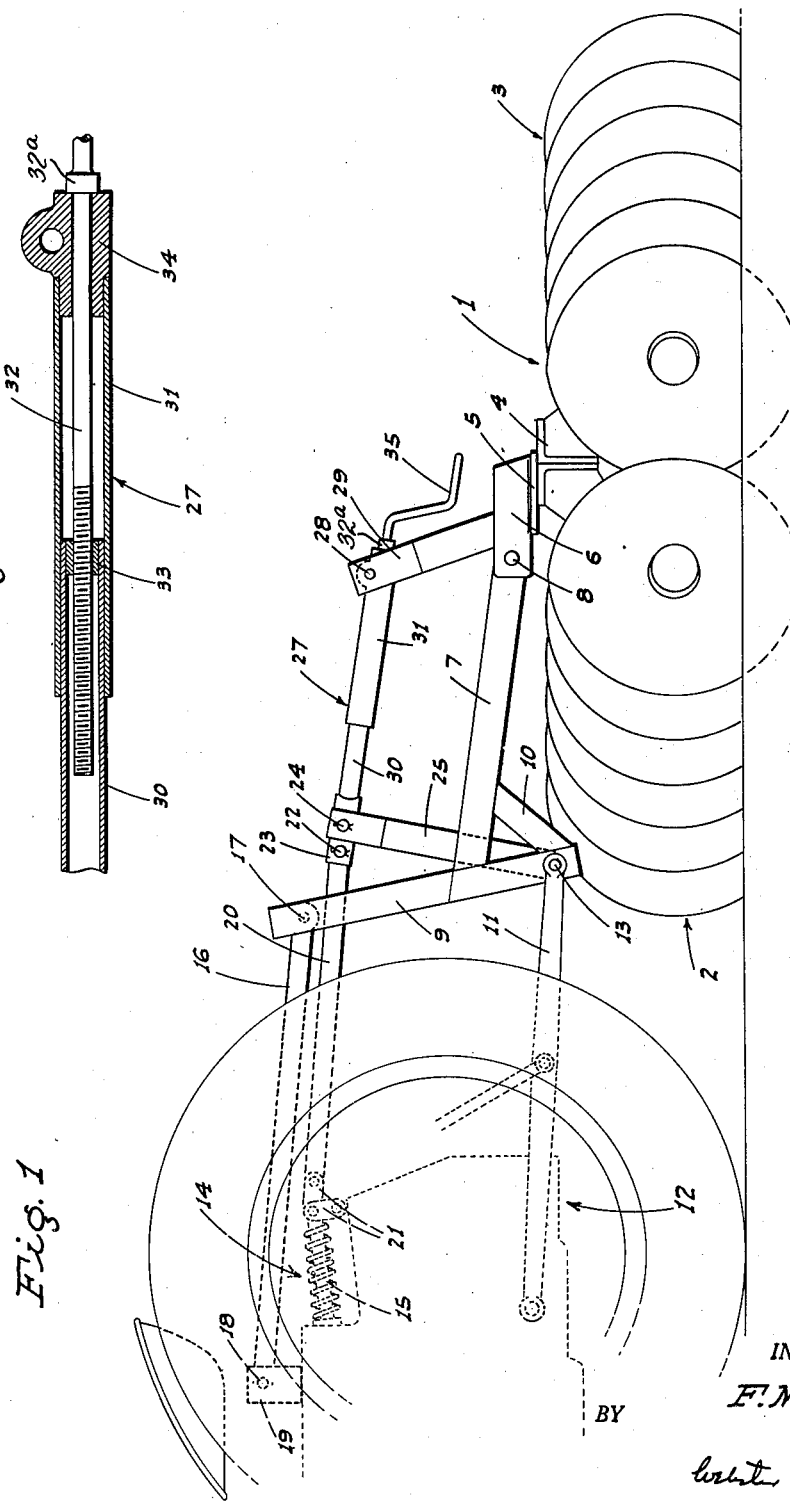
Figure 1 is a side elevation of the hitch as in use between a tractor and disc harrow.
Figure 2:
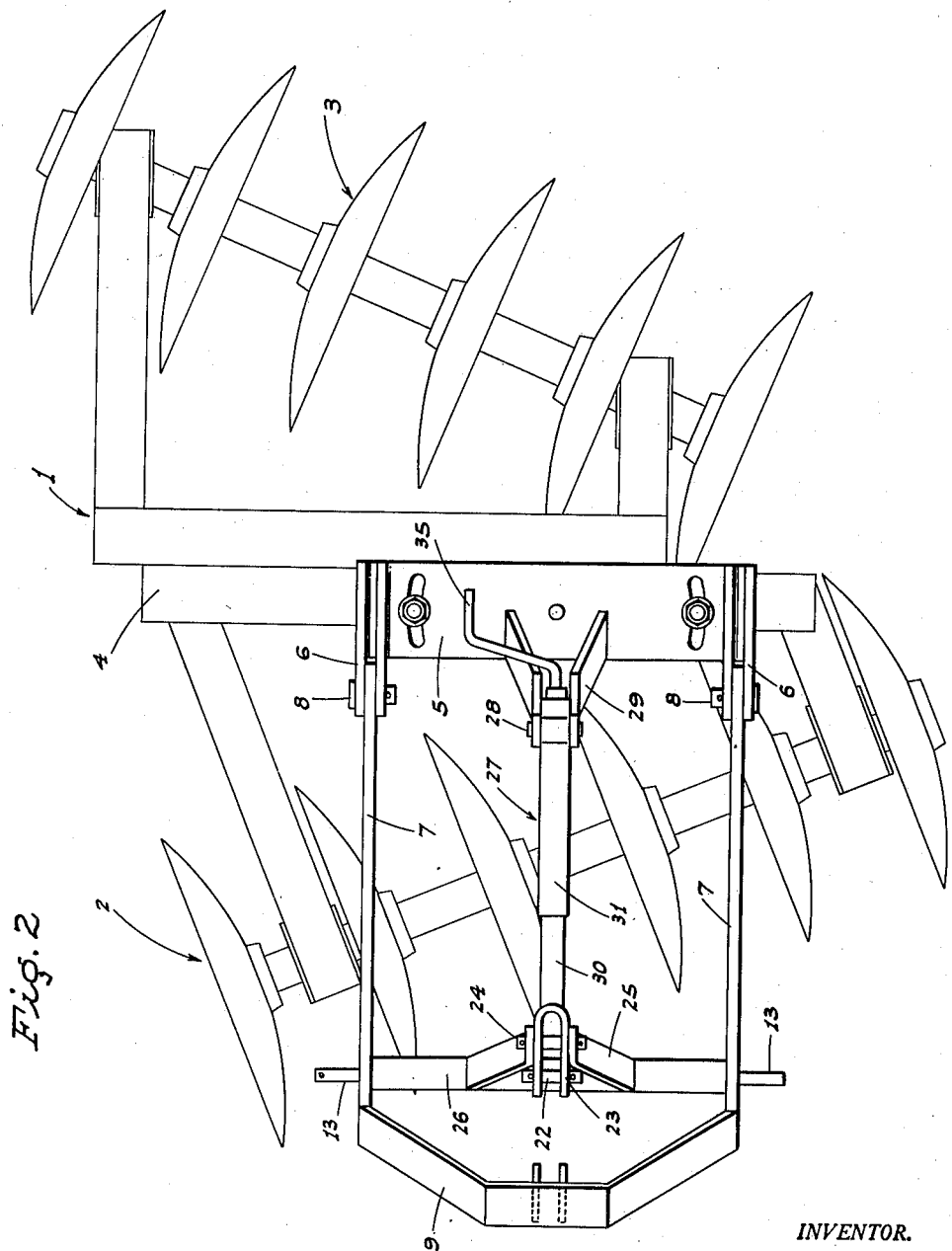
Figure 2 is a plan view of the hitch as mounted on the harrow but detached from the tractor.

Referring now more particularly to the characters of reference on the drawings, the improved lifting hitch for implements is here shown as used in connection with a disc gang harrow indicated generally at 1, which harrow includes a front gang 2, and a rear gang 3 connected together by a frame 4.

The hitch comprises a flat transversely extending draft plate 5 seated on and adjustably secured in connection with the frame 4 between the front gang 2 and the rear gang 3 in the manner shown.

At opposite ends the draft plate 5 is fitted with rigid attachment ears 6 and a pair of transversely spaced longitudinally extending draft arms 7 are pivotally connected to said ears for relative swinging movement in a vertical plane lengthwise of the direction of travel; the pivots being indicated at 8.

At their forward ends the draft arms 7 are fixed in connection with opposite sides of a rigid upstanding A frame 9 adjacent but short of the lower ends thereof. Rigidity between the arms 7 and corresponding sides of the A frame 9 is assured by means of diagonal braces 10. The arms 7 and the A frame 9 form, in effect, a draft frame structure.

The A frame is adapted to be pivotally connected at opposite sides and the lower ends thereof with the rear ends of a transversely spaced pair of rearwardly projecting, power actuated lift links 11 of a tractor, indicated generally at 12. The pivotal connections between the links 11 and the A frame are indicated at 13.

The links 11 are power actuated in a vertical plane and such actuation is controlled by the operator of the tractor, or by an automatic lift control mechanism, shown in part at 14, and which includes a longitudinally extending plunger rod 15. Forward movement of the plunger rod 15 is resisted by an associated spring; such forward motion of the rod causing power actuation of the lift links 11 upwardly through the medium of apparatus on the tractor which is not specifically a part of the present invention.

A tension link 16 is pivotally connected at its rear end, as at 17, to the upper end of the A frame 9, and thence extends longitudinally forward to pivotal connection, as at 18, with a bracket 19 fixed on the tractor above and ahead of the rod 15.

A longitudinal thrust arm 20 is pivotally connected at its forward end through short linkage 21 with the plunger rod 15, and at its rear end the thrust arm 20 is pivotally connected, as at 22, in a clevis 23 which in turn is pivoted, as at 24, on the upper end of an upstanding swing lever assembly 25. The upstanding swing lever assembly 25 includes a cross member 26 which extends between the draft arms 7 and is mounted for rotation about an axis concentric to the pivots 13.

An adjustable connecting rod unit 27 extends lengthwise of the implement from the clevis 23 rearwardly to pivotal connection, as at 28, with the upper end of a post unit 29 mounted on and upstanding from the draft plate centrally of its ends. The adjustable connecting rod unit 27 includes telescopic sleeves 30 and 31, and extension or contraction of the unit 27 is accomplished selectively through the medium of a screw rod 32 threaded through a nut 33 fixed in the sleeve 30 and turnable supported in a bushing 34 fixed in the sleeve 31 and held against axial movement in the direction of the nut 33 by a collar 32a bearing against the outer end of the bushing. Rearwardly of the bushing 34 the rod 32 is formed as a hand crank 35. It will be evident that rotation of the hand crank 35, in one direction or the other, will result in extension or contraction, respectively, of the connecting rod unit 27.

When the described hitch is in use between the tractor 12 and the implement 1, the depth of penetration of the implement into the ground is set by adjustment of the vertical position of the lift links 11. By reason of the described structure of the hitch the major portion of the weight thereof is taken on the lift links 11 and tension link 16, and thus the load of the implement is not imposed, to any substantial extent, on the part 14 of the automatic lift control mechanism, leaving the latter to function normally.

With advance of the implement, ground conditions may, at times, cause an excessive drag, and this drag tends to cause the implement to tilt upwardly at the rear. With such upward tilting of the implement at the rear, the post unit 29 is relatively swung forwardly imparting a thrust to the plunger rod 15 through the connecting rod unit 27 and the thrust arm 20. When this occurs the automatic lift control mechanism of the tractor functions, in the manner described, to lift the implement 1 until the excessive drag is relieved. This operation occurs without any restriction caused by the weight of the implement for the reason that its load imposes no substantial burden on said lift control mechanism.

The adjustable connecting rod unit 27 serves the purpose of seating the implement 1 to the desired working angle in a vertical plane lengthwise of the direction of travel.

The power lift device of the tractor is, of course, subject to manual control by the tractor operator, so that the working depth of the implement can be regulated or the implement raised clear of the ground for turning at the end of a row, or for transport from place to place.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. An implement lifting hitch for a tractor which includes, at the rear, a transversely spaced pair of lift links, and a longitudinally movable thrust arm operative to cause actuation thereof, the hitch comprising a rigid draft frame structure adapted to pivotally connect between the lift links and the implement, said draft frame structure having a rigid upstanding member thereon, a longitudinal tension link adapted to pivotally connect between the tractor and said member above the lift links, and a thrust assembly adapted to connect between the implement and said thrust arm arranged so that drag reaction of the implement acts to urge said thrust arm longitudinally.

2. An implement lifting hitch for a tractor which includes, at the rear, a transversely spaced pair of lift links, and a longitudinally movable thrust arm operative to cause actuation thereof, the hitch comprising a rigid draft frame structure adapted to pivotally connect between the lift links and the implement, said draft frame structure having a rigid upstanding member thereon, a longitudinal tension link adapted to pivotally connect between the tractor and said member above the lift links, and a thrust assembly adapted to connect between the implement and said thrust arm arranged so that drag reaction of the implement acts to urge said thrust arm longitudinally, said assembly being selectively extensible.

3. An implement hitch for connection with a tractor which is provided at its rear with a transversely spaced pair of swingable lift links and a longitudinally movable thrust arm operative to effect swinging of the links, such hitch comprising a rigid draft frame adapted to be connected with the lift links, a tension link adapted to be connected between the draft frame and the tractor above the lift links whereby to maintain the draft frame in working position upon lifting thereof by the links, pivot means for pivotally suspending the implement on the draft frame on a transverse horizontal axis, and thrust means adapted to be connected between the implement and the thrust arm on the tractor and effective to urge the thrust arm longitudinally in response to drag reaction of the implement.

4. An implement hitch for connection with a tractor which is provided at its rear with a transversely spaced pair of swingable lift links and a longitudinally movable thrust arm operative to effect swinging of the links, such hitch comprising a rigid draft frame adapted to be connected with the lift links, such draft frame including a rigid upstanding member, a longitudinal tension link pivoted adjacent the upper end of said member and adapted to be pivotally connected to the tractor above the lift links, pivot means for pivotally supporting the implement on a transverse horizontal axis, and thrust means adapted to be connected between the implement and the thrust arm and effective to urge the thrust arm longitudinally in response to drag reaction of the implement.

5. A hitch structure as in claim 4 in which the thrust means includes a post upstanding from the implement in rigid relation thereto, and a thrust assembly connected with the post and adapted to be connected with said thrust arm.

6. A hitch structure as in claim 5 including adjustment means effective for adjustment of the thrust assembly longitudinally of the implement.

7. A hitch structure as in claim 5, in which said trust assembly is articulated intermediate its ends, said assembly being supported from the draft frame adjacent the point of articulation.

8. An implement hitch for connection with a tractor which is provided at its rear with a transversely spaced pair of swingable lift links and a longitudinally movable thrust arm operative to effect swinging of the links, such hitch comprising a rigid draft frame adapted to be connected with the lift links, such draft frame including an upstanding A-frame at its forward end, pivot means for connecting the lift links to opposite sides of said A-frame, a tension link pivotally connected with the upper end of the A-frame and adapted to be pivotally connected with the tractor above the lift links, pivot means for pivotally suspending the implement on the draft frame on a transverse horizontal axis, and thrust means adapted to be connected between the implement and the thrust arm and effective to urge the thrust arm longitudinally in response to drag reaction of the implement.

9. A hitch structure as in claim 8 in which the thrust means includes an upstanding post disposed in rigid relation with the implement, and a thrust assembly pivotally connected with the post and with said thrust arm.

10. An implement hitch for connection with a tractor which is provided at its rear with a transversely spaced pair of swingable lift links and a longitudinally movable thrust arm operative to effect swinging of the links, such hitch comprising a rigid draft frame, such draft frame including an upstanding A-frame at its forward end, pivot means for pivotally connecting the links to opposite sides of the A-frame, a tension link pivotally connected to the upper end of the A-frame and adapted to be connected with the tractor, a spaced pair of draft arms extending rearwardly from the lower ends of the A-frame, pivot means for pivotally suspending the implement from the rear ends of the draft arms on a transverse horizontal axis, and thrust means adapted to be connected between the implement and the thrust arm and effective to urge the thrust arm longitudinally in response to drag reaction of the implement.

11. A hitch structure as in claim 10 in which the implement suspending means includes a draft plate secured to the implement, transversely spaced ears on the plate, and pivot means connecting the ears with the rear ends of the draft arm.

12. An implement hitch for connection with a tractor which is provided at its rear with a transversely spaced pair of swingable lift links and a longitudinally movable thrust arm operative to effect swinging of the links, such hitch comprising a rigid draft frame, such draft frame including an upstanding A-frame at its forward end, pivot means for pivotally connecting the links to opposite sides of the A-frame, a tension link pivotally connected to the upper end of the A-frame and adapted to be connected with the tractor, a spaced pair of draft arms extending rearwardly from the lower ends of the A-frame, pivot means for pivotally suspending the implement from the rear ends of the draft frame on a transverse horizontal axis, an upstanding lever pivotally connected with the lower end of the A-frame, an upstanding post mounted in rigid relation with the implement, a connecting rod pivotally supported on the upper end of the post and pivotally supported on the upper end of the lever, and pivot means for pivotally connecting the rod with the thrust arm.

13. A structure as in claim 12 in which the connecting rod comprises two telescopically connected members, and manually operated connecting means between said members operable to effect relative longitudinal movement of said members.

FRANK M. FRAGA.

REFERENCES CITED

The following references are of record in the file of this patent:

UNITED STATES PATENTS

| Number | Name | Date |
|---|---|---|
| 2,414,114 | Martin | Jan. 14, 1947 |